(12) United States Patent
Hagino et al.

(10) Patent No.: US 9,998,015 B2
(45) Date of Patent: Jun. 12, 2018

(54) INSULATED SYNCHRONOUS RECTIFICATION DC/DC CONVERTER INCLUDING A PROTECTION CIRCUIT TO JUDGE OCCURRENCE OF A SWITCHING-INCAPABLE STATE

(71) Applicant: Rohm Co., Ltd., Ukyo-ku, Kyoto-shi (JP)

(72) Inventors: Junichi Hagino, Kyoto (JP); Hiroki Kikuchi, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days. days.

(21) Appl. No.: 15/466,413

(22) Filed: Mar. 22, 2017

(65) Prior Publication Data

US 2017/0279363 A1   Sep. 28, 2017

(30) Foreign Application Priority Data

Mar. 23, 2016  (JP) ................. 2016-058088

(51) Int. Cl.
*H02M 3/335*  (2006.01)
*H02M 1/32*   (2007.01)
*H02M 1/08*   (2006.01)
*H02M 1/00*   (2006.01)

(52) U.S. Cl.
CPC ......... *H02M 3/33523* (2013.01); *H02M 1/08* (2013.01); *H02M 1/32* (2013.01); *H02M 3/33592* (2013.01); *H02M 2001/0009* (2013.01)

(58) Field of Classification Search
CPC ...... H02M 3/33523; H02M 1/08; H02M 1/32; H02M 3/33592; H02M 2001/0009
See application file for complete search history.

(56) References Cited

U.S. PATENT DOCUMENTS

| 2010/0027298 | A1* | 2/2010 | Cohen | H02M 3/33592 363/21.14 |
| 2014/0184279 | A1* | 7/2014 | Ikeda | H03K 17/08104 327/109 |
| 2014/0192565 | A1* | 7/2014 | Wang | H02M 3/33592 363/21.14 |
| 2016/0190942 | A1* | 6/2016 | Kikuchi | H02M 3/33507 363/21.14 |
| 2016/0261200 | A1* | 9/2016 | Yabuzaki | H02M 1/32 |

FOREIGN PATENT DOCUMENTS

JP   2012-105522   5/2012

* cited by examiner

*Primary Examiner* — Jue Zhang
*Assistant Examiner* — Lakaisha Jackson
(74) *Attorney, Agent, or Firm* — Fish & Richardson P.C.

(57) ABSTRACT

An insulated synchronous rectification DC/DC converter is provided. A feedback circuit drives a light-emitting element of a first photocoupler such that the output voltage $V_{OUT}$ of the DC/DC converter approaches a target voltage. A primary side controller is coupled to a light-receiving element of the first photocoupler, so as to switch on and off a switching transistor according to a feedback signal $V_{FB}$. A synchronous rectification controller controls a synchronous rectification transistor. Upon detecting the occurrence of a switching-incapable state in the synchronous rectification transistor, a protection circuit instructs the primary side controller to stop the switching operation of the switching transistor.

16 Claims, 8 Drawing Sheets

INSULATED SYNCHRONOUS RECTIFICATION DC/DC CONVERTER INCLUDING A PROTECTION CIRCUIT TO JUDGE OCCURRENCE OF A SWITCHING-INCAPABLE STATE

CROSS-REFERENCE TO RELATED APPLICATIONS

This application is based upon and claims the benefit of priority from the prior Japanese Patent Application No. 2016-058088, filed Mar. 23, 2016, the entire contents of which are incorporated herein by reference.

BACKGROUND OF THE INVENTION

1. Field of the Invention

The present invention relates to an insulated synchronous rectification DC/DC converter.

2. Description of the Related Art

A flyback DC/DC converter is employed in various kinds of power supply circuits such as AC/DC converters. FIG. 1A is a circuit diagram showing a diode rectification flyback converter 200R. FIG. 1B is a circuit diagram showing a synchronous rectification flyback converter 200S.

The flyback converter 200R shown in FIG. 1A receives an input voltage $V_{IN}$ via its input terminal P1, generates an output voltage $V_{OUT}$ in the form of a DC voltage stabilized to a predetermined target voltage, and supplies the output voltage $V_{OUT}$ thus generated to a load (not shown) coupled between its output terminal P2 and a ground terminal P3. A switching transistor M1 is coupled to a primary winding W1 of a transformer T1. A diode D1 is coupled to a secondary winding W2. An output capacitor C1 is coupled to the output terminal P2.

A feedback circuit 206 drives a light-emitting element of a photocoupler 204 using a current that corresponds to the difference between the output voltage $V_{OUT}$ and its target voltage $V_{OUT(REF)}$. A feedback current $I_{FB}$ which corresponds to the difference flows through a light-receiving element of the photocoupler 204. A primary side controller 202 receives a feedback voltage $V_{FB}$ that corresponds to the feedback current $I_{FB}$, generates a pulse signal having a duty ratio (or otherwise frequency) that corresponds to the feedback voltage $V_{FB}$, and drives the switching transistor M1.

With the diode rectification flyback converter shown in FIG. 1A, the diode D1 involves power loss represented by ($V_f \times I_{OUT}$). Here, Vf represents the forward voltage, and $I_{OUT}$ represents the load current. In a case in which Vf=0.5 V and $I_{OUT}$=10 A, such an arrangement involves power loss of 5 W. Accordingly, in many usage cases, such an arrangement requires a radiator plate or a heat sink in order to cool the diode D1.

The flyback converter 200S shown in FIG. 1B includes a synchronous rectification transistor M2 and a synchronous rectification controller (which will also be referred to as the "synchronous rectification IC") 300S, instead of the diode D1 shown in FIG. 1A. The synchronous rectification controller 300S switches on and off the synchronous rectification transistor M2 in synchronization with the switching operation of the primary-side switching transistor M1.

With such a synchronous rectification flyback converter, the synchronous rectification transistor M2 involves power loss represented by $R_{ON} \times I_{OUT}^2$. Here, $R_{ON}$ represents the on resistance of the synchronous rectification transistor M2. In a case in which $R_{ON}$=5 mΩ and $I_{OUT}$=10 A, such an arrangement involves power loss of 0.5 W. Such an arrangement allows the power loss to be dramatically reduced as compared with diode rectification converters. Thus, in principle, such a synchronous rectification converter requires no radiator plate or heat sink, or otherwise requires only a low heat sink performance.

As a result of investigating such a synchronous rectification flyback converter shown in FIG. 1B, the present inventor has come to recognize the following problem.

With the flyback converter 200S shown in FIG. 1B, if a short circuit occurs between the gate and the source of the synchronous rectification transistor M2, this leads to a problem in that the synchronous rectification transistor M2 cannot be turned on. Also, in a case in which a fault has occurred in the internal components of the synchronous rectification controller 300S, this leads to a situation in which that the synchronous rectification transistor M2 cannot be turned on.

In a case in which the synchronous rectification transistor M2 cannot be turned on, a body diode D2 of the synchronous rectification transistor M2 provides the same function as that of the diode D1 shown in FIG. 1A. Accordingly, even in such a situation, such an arrangement operates as a diode rectification converter. That is to say, even in such a situation, such an arrangement supplies an appropriate output voltage $V_{OUT}$ to the load. However, such an arrangement involves large power loss of 5 W at the body diode D2, which is a problem.

That is to say, with such a flyback converter 200S shown in FIG. 1B, in the assumption that an abnormality may occur in which the synchronous rectification transistor M2 cannot be turned on, there is a need to prepare countermeasures for releasing heat from the synchronous rectification transistor M2 as with the flyback converter 200R shown in FIG. 1A.

SUMMARY OF THE INVENTION

The present invention has been made in order to solve such a problem. Accordingly, it is an exemplary purpose of an embodiment of the present invention to provide a DC/DC converter that is capable of suppressing heat generation.

An embodiment of the present invention relates to an insulated synchronous rectification DC/DC converter. The DC/DC converter comprises: a transformer having a primary winding and a secondary winding; a switching transistor coupled to the primary winding of the transformer; a synchronous rectification transistor coupled to the secondary winding of the transformer; a first photocoupler having a light-emitting element and a light-receiving element; a feedback circuit structured to drive the light-emitting element of the first photocoupler such that an output voltage of the DC/DC converter approaches a target voltage; a primary side controller coupled to the light-receiving element of the first photocoupler, and structured to switch on and off the switching transistor according to a feedback signal received from the first photocoupler; a synchronous rectification controller structured to control the synchronous rectification transistor; and a protection circuit structured to instruct the primary side controller to stop a switching operation of the switching transistor when a switching-incapable state of the synchronous rectification transistor is detected.

With such an embodiment, upon detecting a switching-incapable state in which the synchronous rectification transistor cannot turn on, the switching operation of the switching transistor is stopped. Such an arrangement is capable of preventing the DC/DC converter from continuing the operation in the diode rectification mode. Such an arrangement is capable of suppressing heat generation at the synchronous rectification transistor.

Also, the protection circuit may be structured to judge that the switching-incapable state has occurred when an absolute value of a drain-source voltage of the synchronous rectification transistor exceeds a first threshold voltage in a period in which the synchronous rectification transistor is to be turned on.

When the synchronous rectification transistor is turned on, the voltage drop across the synchronous rectification transistor is lower than the forward voltage of the body diode. Thus, by providing a first threshold voltage between the voltage drop and the forward voltage, such an arrangement is capable of judging whether or not the synchronous rectification transistor performs a switching operation.

Also, the protection circuit may be structured to judge that the switching-incapable state has occurred when a frequency at which a drain-source voltage of the synchronous rectification transistor crosses a second threshold voltage deviates from a predetermined range.

If the switching operation of the synchronous rectification transistor stops, this leads to a change in the switching frequency of the primary side switching transistor. In this case, the frequency of the drain-source voltage of the synchronous rectification transistor changes according to the change in the switching frequency of the primary side switching transistor. Such an embodiment is capable of judging whether or not the synchronous rectification transistor performs a switching operation.

Also, the protection circuit may be structured to judge that the switching-incapable state has occurred, based on whether or not a signal at a gate terminal of the synchronous rectification transistor is consistent with an internal signal of the synchronous rectification controller.

This allows a short circuit that can occur in the gate terminal or the like to be detected.

Also, the DC/DC converter according to an embodiment may further comprise a second photocoupler having a light-emitting element coupled to the protection circuit and a light-receiving element coupled to the primary side controller. Also, when the switching-incapable state is detected, the protection circuit may drive the light-emitting element of the second photocoupler. Also, when a current flows through the light-receiving element of the second photocoupler, the primary side controller may stop a switching operation of the switching transistor.

Also, the DC/DC converter according to an embodiment may further comprise a pulse transformer having a primary winding coupled to the protection circuit and a secondary winding coupled to the primary side controller. Also, when the switching-incapable state is detected, the protection circuit may drive the primary winding of the pulse transformer. Also, the primary side controller may be structured to stop a switching operation of the switching transistor based on a state of the secondary winding of the pulse transformer.

Also, when the switching-incapable state is detected, the protection circuit may drive the light-emitting element of the first photocoupler.

When the protection circuit drives the first photocoupler, the feedback control operation of the feedback circuit is disabled. This leads to an increase in the feedback current on the primary side, which lowers the feedback voltage to the vicinity of 0 V. This allows the switching operation of the switching transistor to be stopped.

Another embodiment of the present invention relates to an electronic device. The electronic device comprises: a load; a diode rectifier circuit structured to perform full-wave rectification of a commercial AC voltage; a smoothing capacitor structured to smooth an output voltage of the diode rectifier circuit, so as to generate a DC input voltage; and the DC/DC converter structured to step down the DC input voltage, and to supply the voltage thus stepped down to the load.

Yet another embodiment of the present invention relates to an AC adapter. The AC adapter comprises: a load; a diode rectifier circuit structured to perform full-wave rectification of a commercial AC voltage; a smoothing capacitor structured to smooth an output voltage of the diode rectifier circuit, so as to generate a DC input voltage; and the DC/DC converter structured to step down the DC input voltage, and to supply the voltage thus stepped down to the load.

Yet another embodiment of the present invention relates to a synchronous rectification circuit arranged on a secondary side of an insulated synchronous rectification DC/DC converter, and structured to control a synchronous rectification transistor. The synchronous rectification circuit comprises: a pulse generator structured to generate a control pulse based on a drain-source voltage of the synchronous rectification transistor; a driver structured to drive the synchronous rectification transistor based on the control pulse; a detection circuit structured to detect a switching-incapable state of the synchronous rectification transistor; and a notifying circuit structured to transmit a notice of a detection result of the switching-incapable state to a primary side controller arranged on a primary side of the DC/DC converter.

Also, the synchronous rectification circuit may be monolithically integrated on a single semiconductor substrate.

Examples of such a "monolithically integrated" arrangement include: an arrangement in which all the circuit components are formed on a semiconductor substrate; and an arrangement in which principal circuit components are monolithically integrated. Also, a part of the circuit components such as resistors and capacitors may be arranged in the form of components external to such a semiconductor substrate in order to adjust the circuit constants. By monolithically integrating the circuit on a single chip, such an arrangement allows the circuit area to be reduced, and allows the circuit elements to have uniform characteristics.

It is to be noted that any arbitrary combination or rearrangement of the above-described structural components and so forth is effective as and encompassed by the present embodiments. Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, examples of the state represented by the phrase "the member A is coupled to the member B" include: a state in which the member A is physically and directly coupled to the member B; and a state in which the member A is coupled to the member B via another member that does not substantially affect the electric connection therebetween, or that does not damage the functions of the connection therebetween.

Similarly, the state represented by the phrase "the member C is provided between the member A and the member B" includes a state in which the member A is indirectly coupled to the member C, or the member B is indirectly coupled to the member C via another member that does not substantially affect the electric connection therebetween, or that does not damage the functions of the connection therebetween, in addition to a state in which they are directly coupled.

Figure 1A:
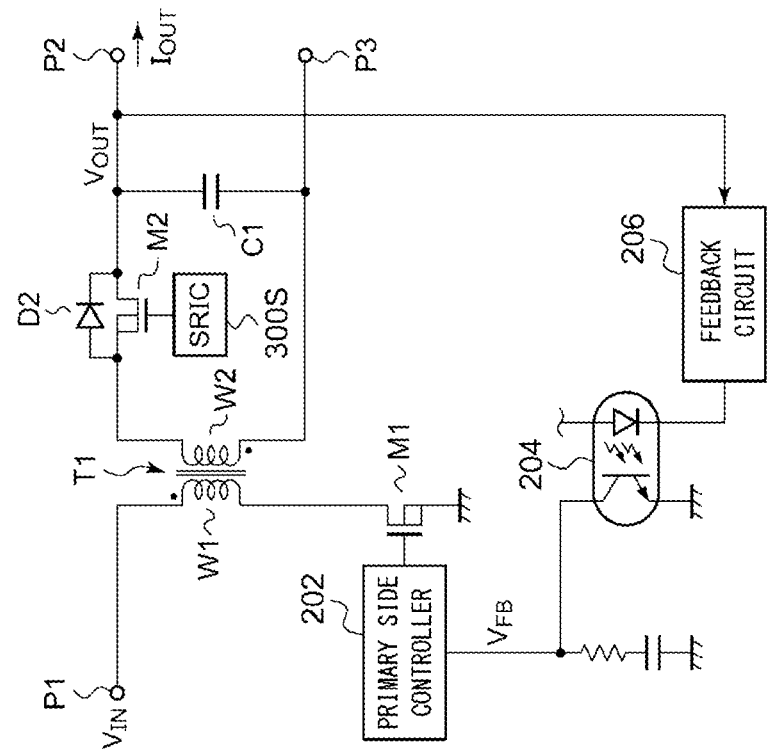
FIG. 1A is a circuit diagram showing a diode rectification flyback converter.
Figure 1B:
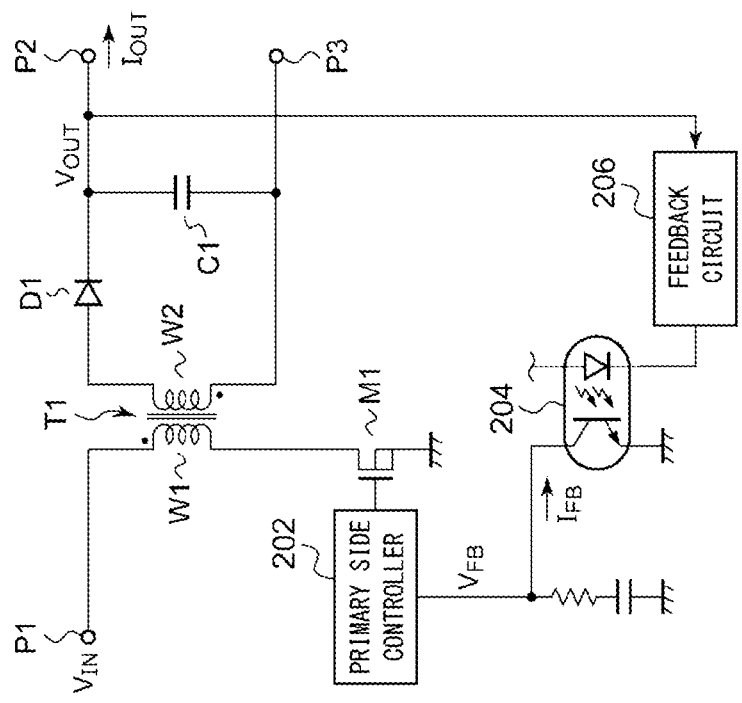
FIG. 1B is a circuit diagram showing a synchronous rectification flyback converter.
Figure 2:
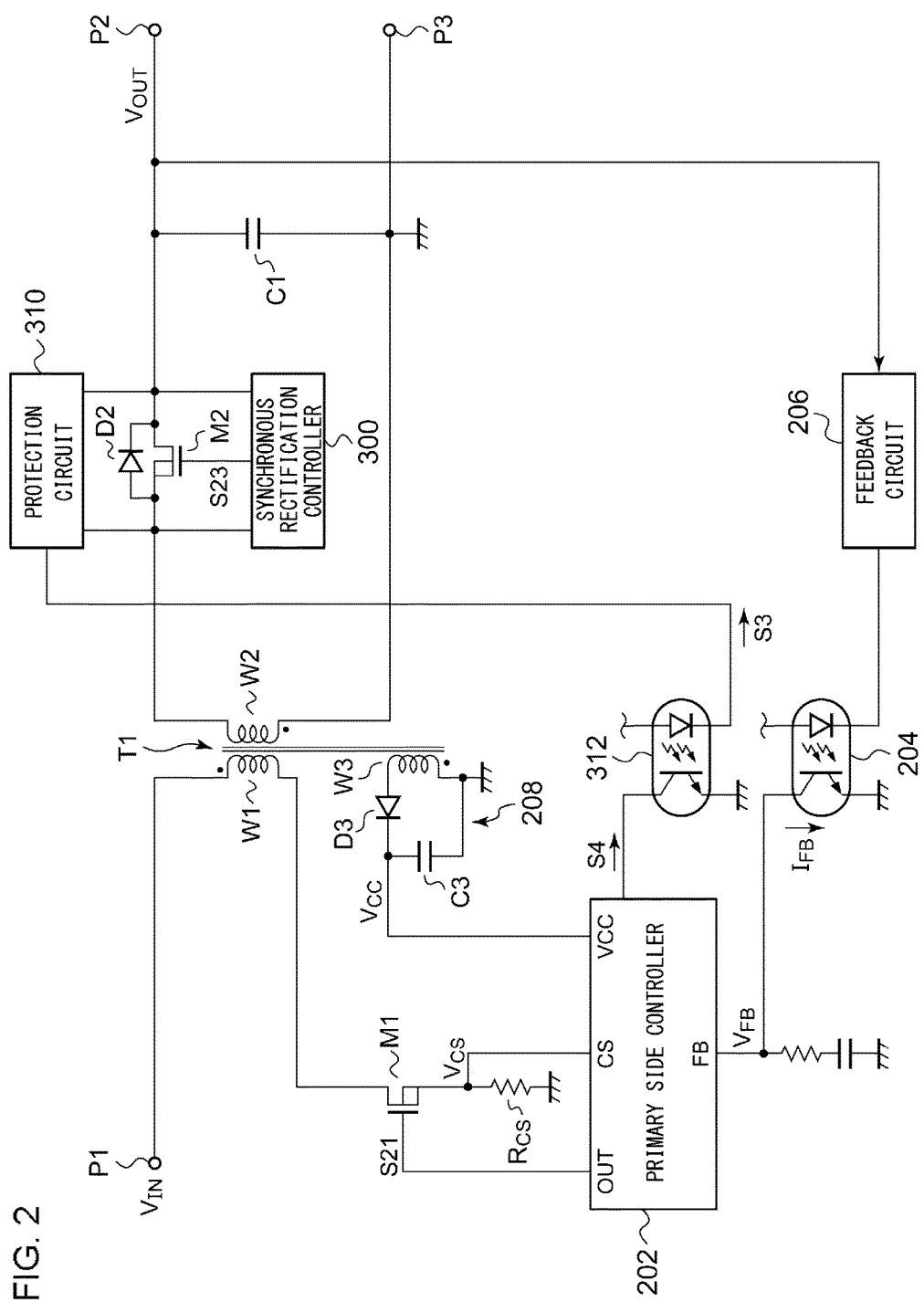
FIG. 2 is a circuit diagram showing a DC/DC converter according to an embodiment.

FIG. 2 is a circuit diagram showing a DC/DC converter 200 according to an embodiment. The DC/DC converter 200 receives an input voltage $V_{IN}$ via its input terminal P1, generates an output voltage $V_{OUT}$ in the form of a DC voltage stabilized to a predetermined target voltage, and supplies the output voltage $V_{OUT}$ thus generated to a load (not shown) coupled to its output terminal P2.

A transformer T1 includes a primary winding W1, a secondary winding W2, and an auxiliary winding W3. One end of the primary winding W1 is coupled to the input terminal P1, which receives the DC input voltage $V_{IN}$. The drain of a switching transistor M1 is coupled to the other end of the primary winding W1 of the transformer T1. A sensing resistor $R_{CS}$, which is configured to detect a current, is arranged between the source of the switching transistor M1 and the ground line.

A synchronous rectification transistor M2 and the secondary winding W2 of the transformer T1 are arranged in series between the output terminal P2 and the ground terminal P3. In an example shown in FIG. 2, the synchronous rectification transistor M2 is arranged at a position more toward the higher electric potential side than the secondary winding W2. An output capacitor C1 is coupled between the output terminal P2 and the ground terminal P3.

A first photocoupler 204 includes a light-emitting element and a light-receiving element. A feedback circuit 206 drives the light-emitting element of the first photocoupler 204 such that the output voltage $V_{OUT}$ of the DC/DC converter 200 approaches a target voltage $V_{OUT(REF)}$. For example, the feedback circuit 206 may include a shunt regulator or may include an error amplifier.

The primary side controller 202 is coupled to the light-receiving element of the first photocoupler 204. The primary side controller 202 receives, as an input signal, via its feedback (FB) terminal, a feedback signal $V_{FB}$ that corresponds to a feedback current $I_{FB}$ that flows through the light-receiving element of the first photocoupler 204. Furthermore, the primary side controller 202 receives, as an input signal, via its current sensing (CS) terminal, a current detection signal $V_{CS}$ that occurs at the sensing resistor $R_{CS}$.

The primary side controller 202 generates a pulse signal S21 having a duty ratio (or otherwise a frequency) that corresponds to the feedback signal $V_{FB}$, and outputs the pulse signal S21 thus generated via its output (OUT) terminal, so as to drive the switching transistor M1. The configuration of the primary side controller 202 and the control method thereof are not restricted in particular. For example, the primary side controller 202 may be configured as a current mode modulator. In this case, the duty ratio of the pulse signal S21 may be adjusted according to the current detection signal $V_{CS}$.

The auxiliary winding W3 of the transformer T1 forms a self-power supply circuit 208 together with a diode D3 and a capacitor C3. The power supply voltage $V_{CC}$ generated by the self-power supply circuit 208 is supplied to a power supply (VCC) terminal of the primary side controller 202.

The synchronous rectification controller 300 controls the synchronous rectification transistor M2. For example, the synchronous rectification controller 300 generates a control pulse S22 (not shown) according to the drain-source voltage $V_{DS}$ of the synchronous rectification transistor M2, and supplies a gate pulse S23 that corresponds to the control pulse S22 to the gate of the synchronous rectification transistor M2.

A protection circuit 310 is configured to be capable of detecting a state in which the synchronous rectification transistor M2 remains in the off state and cannot be turned on (switching-incapable state). When the protection circuit 310 detects such a switching-incapable state, the protection circuit 310 instructs the primary side controller 202 to suspend the switching operation of the switching transistor M1. The protection circuit 310 may be integrated on the same IC chip as the synchronous rectification controller 300. Alternatively, the protection circuit 310 and the synchronous rectification controller 300 may be respectively configured in the form of separate IC chips.

For example, the protection circuit 310 and the primary side controller 202 are coupled via a second photocoupler 312. Upon detecting a switching-incapable state, the protection circuit 310 drives a light-emitting element of the second photocoupler 312, and accordingly, a current S3 flows through the light-emitting element. This provides a current S4 that flows through a light-receiving element of the second photocoupler 312, which notifies the primary side controller 202 of the occurrence of the switching-incapable state. The primary side controller 202 suspends the switching operation of the switching transistor M1 in response to the notice.

The above is the configuration of the DC/DC converter 200. Next, description will be made regarding the operation thereof.

In a normal state in which the synchronous rectification transistor M2 switches on and off in synchronization with the switching transistor M1, the DC/DC converter 200 operates as a synchronous rectification flyback converter.

In a case in which a short circuit has occurred between the gate and the source of the synchronous rectification transistor M2 or otherwise in a case in which a fault has occurred in the internal components of the synchronous rectification controller 300, this leads to a situation in which the synchronous rectification transistor M2 cannot be turned on. In this case, the DC/DC converter 200 starts its operation in the diode rectification mode. Upon detecting a situation in which the switching operation of the synchronous rectification transistor M2 has not been performed, the protection circuit 310 transmits a notice to the primary side controller 202 via the second photocoupler 312. As a result, the switching operation of the switching transistor M1 is stopped, thereby preventing the current from flowing through the body diode D2 of the synchronous rectification transistor M2.

The above is the operation of the DC/DC converter 200. The DC/DC converter 200 is capable of preventing the synchronous rectification transistor M2 package from generating heat due to a current that continuously flows through the body diode D2 of the synchronous rectification transistor M2.

Furthermore, by suppressing heat generation at the synchronous rectification transistor M2 package, such an arrangement is capable of reducing costs required for countermeasures for suppressing heat generation of the DC/DC converter 200.

The present invention encompasses various kinds of apparatuses and circuits that can be regarded as a block configuration or a circuit configuration shown in FIG. 2, or otherwise that can be derived from the aforementioned description. That is to say, the present invention is not restricted to a specific circuit configuration. More specific description will be made below regarding an example configuration for clarification and ease of understanding of the essence of the present invention and the circuit operation. That is to say, the following description will by no means be intended to restrict the technical scope of the present invention.

Next, description will be made regarding several examples of a detection method employed by the protection circuit 310 for detecting a switching-incapable state.

[First Detection Method]

When the absolute value of the drain-source voltage $V_{DS}$ of the synchronous rectification transistor M2 exceeds a first threshold voltage $V_{TH1}$ in a period in which the synchronous rectification transistor M2 is to be turned on, the protection circuit 310 judges that a switching-incapable state has occurred. The first threshold voltage $V_{TH1}$ is designed such that it is larger than the voltage drop $R_{ON} \times I_S$ that occurs when the secondary current $I_S$ flows through the synchronous rectification transistor M2 via the secondary winding W2, and such that it is smaller than the forward voltage Vf of the body diode D2.

Figure 3:
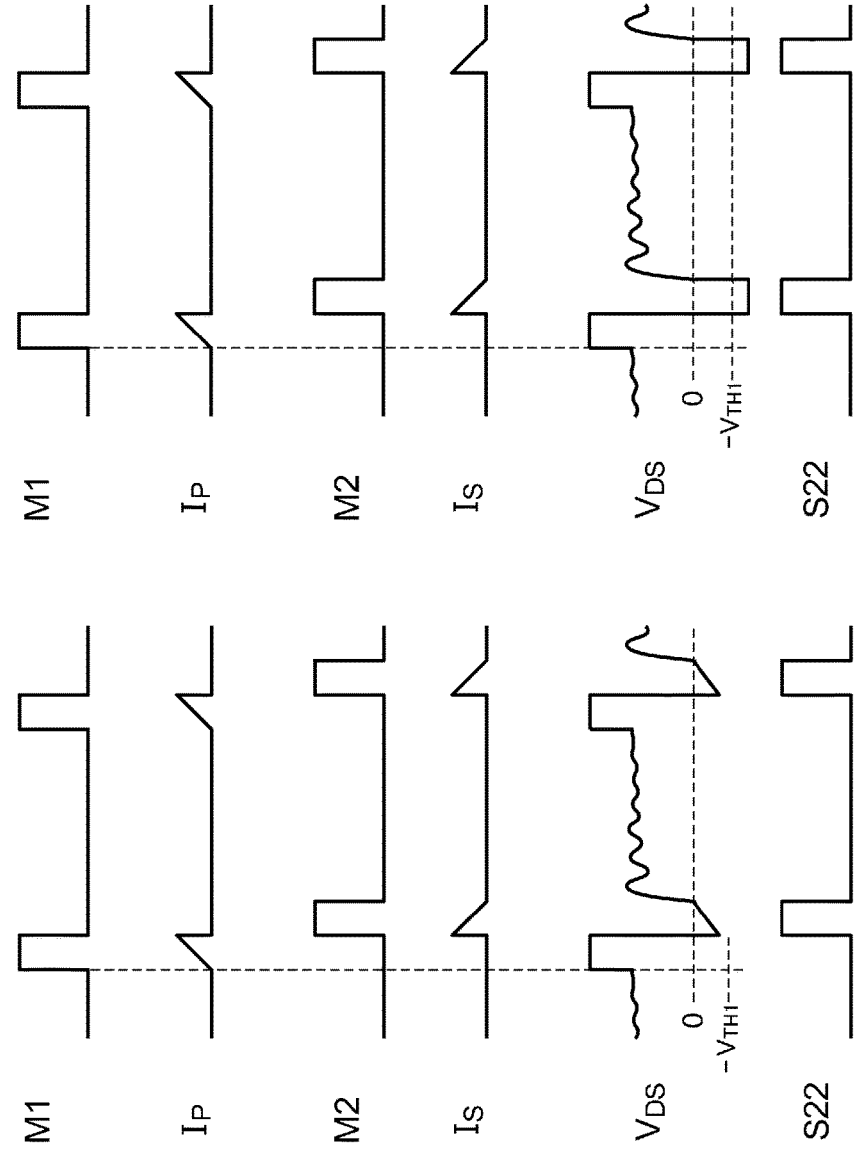
FIGS. 3A and 3B are waveform diagrams for explaining a first detection method.

FIGS. 3A and 3B are waveform diagrams for explaining the first detection method. FIG. 3A is an operation waveform diagram showing a normal state, i.e., the operation in the synchronous rectification mode. FIG. 3B is an operation waveform diagram showing the switching-incapable state, i.e., the operation in the diode rectification mode. It should be noted that the vertical axis and the horizontal axis shown in the waveform diagrams and the time charts in the present specification are expanded or reduced as appropriate for ease of understanding. Also, each waveform shown in the drawing is simplified or exaggerated for emphasis for ease of understanding.

In the normal operation state shown in FIG. 3A, during the on period of the synchronous rectification transistor M2, the absolute value of the voltage across both electrodes of the synchronous rectification transistor M2 is represented by $R_{ON} \times I_S$, which is smaller than the first threshold voltage $V_{TH1}$. In this case, the drain voltage ($V_{DS}$) of the synchronous rectification transistor M2 is higher than a negative first threshold voltage $-V_{TH1}$. In contrast, in the switching-incapable state shown in FIG. 3B, a current flows through the body diode D2. Accordingly, the absolute value of the voltage across both electrodes of the synchronous rectification transistor M2 matches the forward voltage Vf, which is higher than the first threshold voltage $V_{TH1}$. In this case, the drain voltage ($V_{DS}$) of the synchronous rectification transistor M2 is lower than the negative first threshold voltage $-V_{TH1}$.

Thus, with the first detection method, such an arrangement is capable of judging whether the operation state is the normal operation state or the switching-incapable state.

[Second Detection Method]

When the frequency at which the drain-source voltage $V_{DS}$ of the synchronous rectification transistor M2 crosses a second threshold voltage $V_{TH2}$ deviates from a predetermined range, the protection circuit 310 judges that the switching-incapable state has occurred.

If the switching operation of the synchronous rectification transistor M2 stops, the switching frequency of the primary side switching transistor M1 changes. This leads to a change in the frequency of the drain-source voltage $V_{DS}$ of the synchronous rectification transistor M2. With the second detection method, such an arrangement is capable of judging the presence or absence of the switching operation of the synchronous rectification transistor based on the switching frequency of the primary side switching transistor M1.

[Third Detection Method]

Figure 4:
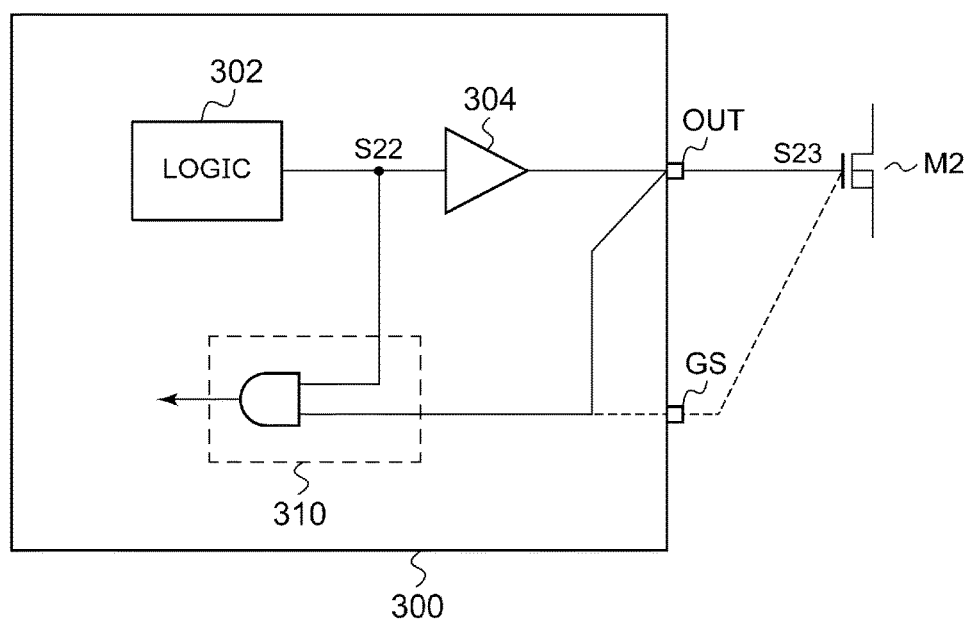
FIG. 4 is a circuit diagram showing a synchronous rectification controller and a protection circuit that support a third detection method.

FIG. 4 is a circuit diagram showing the synchronous rectification controller 300 and the protection circuit 310 that support a third detection method. The protection circuit 310 may judge whether or not the switching-incapable state has occurred based on whether or not a signal (gate pulse S23) at the gate terminal of the synchronous rectification transistor M2 is consistent with an internal signal of the synchronous rectification controller 300. The protection circuit 310 is integrated on the same IC chip as the synchronous rectification controller 300.

The synchronous rectification controller 300 includes a logic circuit 302 that generates a control pulse S22 for instructing the synchronous rectification transistor M2 to turn on and off, and a driver 304 that generates the gate pulse S23 to be supplied to the synchronous rectification transistor M2 according to the control pulse S22.

For example, the protection circuit 310 may be configured as an AND gate, an XOR (exclusive OR) gate, or a NAND gate.

In the normal operation state, when the control pulse S22, which is an internal signal, is set to the high level, the gate pulse S23 is also set to the high level. In this case, in a case in which the protection circuit 310 is configured as an AND gate, the output of the protection circuit 310 is also set to the high level.

Let us consider a case in which a switching-incapable state has occurred due to the occurrence of a short circuit between the gate and the source of the synchronous rectification transistor M2 or due to the occurrence of a short circuit between the output of the driver 304 and the ground. In this case, the gate pulse S23 remains at the low level even when the control pulse S22 is set to the high level. In this case, in a case in which the protection circuit 310 is configured as an AND gate, the output of the protection circuit 310 is set to the low level. Thus, such an arrangement is capable of detecting the occurrence of a short circuit at the gate terminal or the like based on the output of the AND gate.

In FIG. 4, in addition to the OUT pin, a gate sensing (GS) pin may be further provided in order to monitor the gate pulse S23 of the synchronous rectification transistor M2. The protection circuit 310 may detect the occurrence of the switching-incapable state based on whether or not the control pulse S22 configured as an internal signal is consistent with an output signal of the GS pin.

Description has been made with reference to FIG. 4 regarding an arrangement in which the control pulse S22, which indicates an expected value of the gate pulse S23, is employed as the internal signal. However, the present invention is not restricted to such an arrangement. Also, an internal signal having a logic level that is the opposite of that of the gate pulse S23 may be employed as a reference signal.

It should be noted that various combinations of the first detection method through the third detection method may be made, which may be employed as desired.

Figure 5:
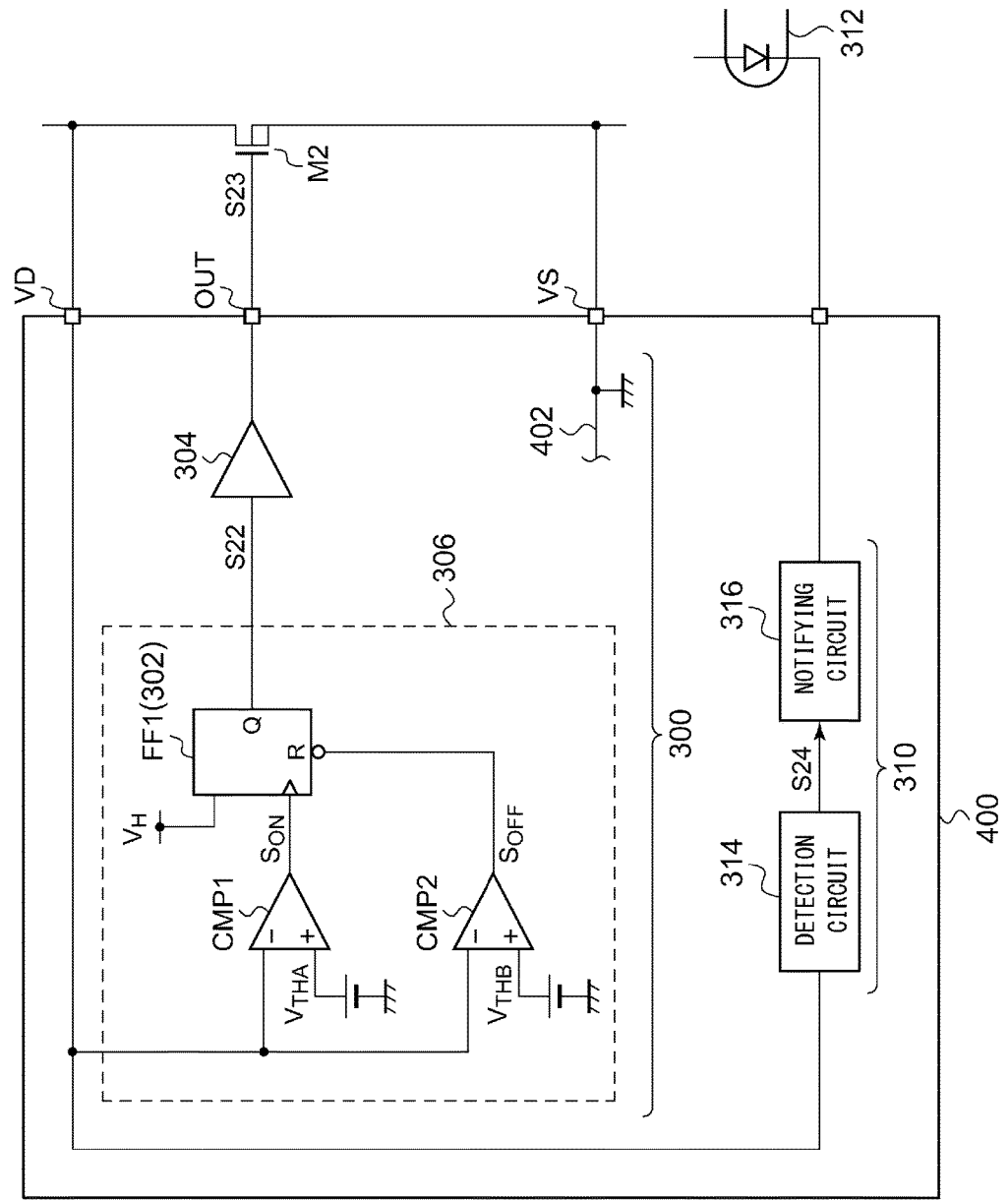
FIG. 5 is a circuit diagram showing an example configuration of a synchronous rectification circuit.

FIG. 5 is a circuit diagram showing an example configuration of a synchronous rectification circuit 400. The synchronous rectification circuit 400 is configured as a function IC on which the synchronous rectification controller 300 and the protection circuit 310 described above are monolithically integrated.

The synchronous rectification circuit 400 is arranged such that its drain (VD) terminal is coupled to the drain of the synchronous rectification transistor M2, its source (VS) terminal is coupled to the source of the synchronous rectification transistor M2, and its output (OUT) terminal is coupled to the gate of the synchronous rectification transistor M2. The VS terminal is coupled to a ground line 402 of the synchronous rectification circuit 400. The synchronous rectification circuit 400 operates with the source voltage of the synchronous rectification transistor M2 as a reference voltage.

The synchronous rectification controller 300 includes a pulse generator 306 and a driver 304. The pulse generator 306 generates a control pulse S22 based on the drain-source voltage $V_{DS}$ of the synchronous rectification transistor M2. It should be noted that the synchronous rectification circuit 400 operates with the electric potential at the source of the synchronous rectification transistor M2 as a reference electric potential. Accordingly, the drain-source voltage $V_{DS}$ is equivalent to the drain voltage $V_D$. That is to say, the pulse generator 306 generates the control pulse S22 based on the drain voltage $V_D$ of the synchronous rectification transistor M2.

The pulse generator 306 includes a first comparator CMP1, a second comparator CMP2, and a flip-flop FF1. The first comparator CMP1 is provided in order to detect the turn-off of the switching transistor M1. The first comparator CMP1 compares the drain voltage (drain-source voltage) $V_D$ at the VD terminal with a predetermined negative first threshold voltage $V_{THA}$ (e.g., −150 mV). When the drain voltage $V_D$ crosses the negative first threshold voltage $V_{THA}$, the first comparator CMP1 asserts (sets to the high level) a set signal $S_{ON}$. Specifically, when the drain voltage $V_D$ is lower than $V_{THA}$, i.e., when the drain-source voltage $V_{DS}$ becomes a negative voltage, the set signal $S_{ON}$ is set to the high level. The set signal $S_{ON}$ is input to the clock terminal of the D flip-flop FF1. The control pulse S22 is set to the high level in response to a positive edge of the set signal $S_{ON}$. Also, an RS flip-flop may be employed instead of such a D flip-flop FF1.

The second comparator CMP2 is provided in order to detect whether or not the secondary current $I_S$ that flows through the secondary winding W2 becomes substantially zero in the on period of the synchronous rectification transistor M2. During the on period of the synchronous rectification transistor M2, a current $I_S$ flows from the source to the drain of the synchronous rectification transistor M2. In this state, the drain-source voltage $V_{DS}$ becomes a negative voltage. Furthermore, the drain-source voltage $V_{DS}$ has an absolute value that corresponds to the current value of the current $I_S$. With such an arrangement, the second comparator CMP2 compares the drain voltage $V_D$ with a negative threshold voltage $V_{THB}$ (e.g., −10 mV) set in the vicinity of zero. When the drain voltage $V_D$ becomes higher than the threshold voltage $V_{THB}$, the second comparator CMP2 asserts (sets to the low level) a reset signal $S_{OFF}$. The reset signal $S_{OFF}$ is input to a reset terminal (logical inversion) of the flip-flop FF1. The control pulse S22 is set to the low level in response to a negative edge of the reset signal $S_{OFF}$.

The protection circuit 310 includes a detection circuit 314 and a notifying circuit 316. The detection circuit 314 detects the switching-incapable state that can occur in the synchronous rectification transistor M2. The notifying circuit 316 receives a detection signal S24. When the switching-incapable state is detected, the notifying circuit 316 transmits a notice thereof to the primary side controller 202 arranged on the primary side of the DC/DC converter. For example, the notifying circuit 316 may be configured to be capable of driving a second photocoupler 312 configured as an external component of the synchronous rectification circuit 400. For example, the notifying circuit 316 may have an open-collector output stage or an open-drain output stage.

Figure 6A:
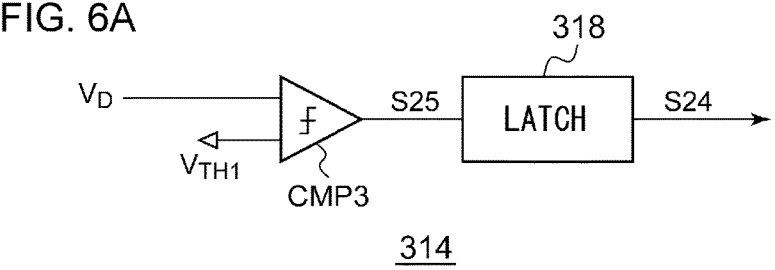
FIGS. 6A and 6B are circuit diagrams each showing an example configuration of a detection circuit.
Figure 6B:
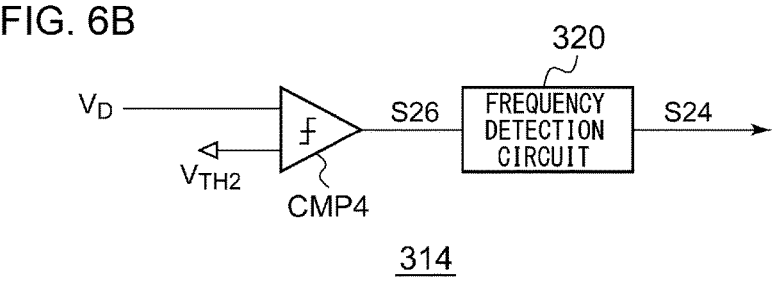

FIGS. 6A and 6B are circuit diagrams each showing an example configuration of the detection circuit 314. A detection circuit 314a shown in FIG. 6A supports the first detection method. The detection circuit 314a includes a third comparator CMP3. The third comparator CMP3 compares the drain voltage $V_D$ (drain-source voltage $V_{DS}$) with the first threshold voltage $V_{TH1}$. When the drain-source voltage $V_{DS}$ exceeds the first threshold voltage $V_{TH1}$, the third comparator CMP3 asserts (sets to the high level, for example) a comparison signal S25. When the comparison signal S25 is asserted, the latch circuit 318 asserts the detection signal S24. The latch circuit 318 may be configured as a part of the notifying circuit 316.

A detection circuit 314b shown in FIG. 6B supports the second detection method. The detection circuit 314b includes a fourth comparator CMP4 and a frequency detection circuit 320. The fourth comparator CMP4 compares the drain voltage $V_D$ (drain-source voltage $V_{DS}$) with a second threshold voltage $V_{TH2}$. The fourth comparator CMP4 outputs an output S26 that transits every time the drain-source voltage $V_{DS}$ crosses the second threshold voltage $V_{TH2}$. The frequency detection circuit 320 measures the frequency (period) of the output S26 of the fourth comparator CMP4. When the measurement value deviates from a predetermined range, the frequency detection circuit 320 asserts the detection signal S24. It should be noted that the first comparator CMP1 or the second comparator CMP2 shown in FIG. 5 may also be configured to function as the fourth comparator CMP4.

Description has been made above regarding the present invention with reference to the embodiment. The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

[First Modification]

Description has been made in the embodiment regarding an arrangement in which the protection circuit 310 transmits a notice of the occurrence of the switching-incapable state to the primary side controller 202 via the second photocoupler 312. However, the notifying method is not restricted to such an arrangement. Also, a transformer such as a pulse transformer may be employed instead of such a photocoupler.

[Second Modification]

Also, the second photocoupler 312 may be omitted. In this case, upon detecting the occurrence of the switching-incapable state, the protection circuit 310 may drive the light-emitting element of the first photocoupler 204. When the protection circuit 310 drives the first photocoupler 204, the feedback control operation of the feedback circuit 206 is disabled. This raises the feedback current $I_{FB}$ on the primary side, which lowers the feedback voltage $V_{FB}$ to the vicinity of 0 V. Thus, such an arrangement allows the switching operation of the switching transistor M1 to be stopped.

[Third Modification]

The synchronous rectification transistor M2 may be arranged at a position more toward the lower electric potential side (ground terminal P3 side) than the secondary winding W2.

[Usage]

Figure 7:
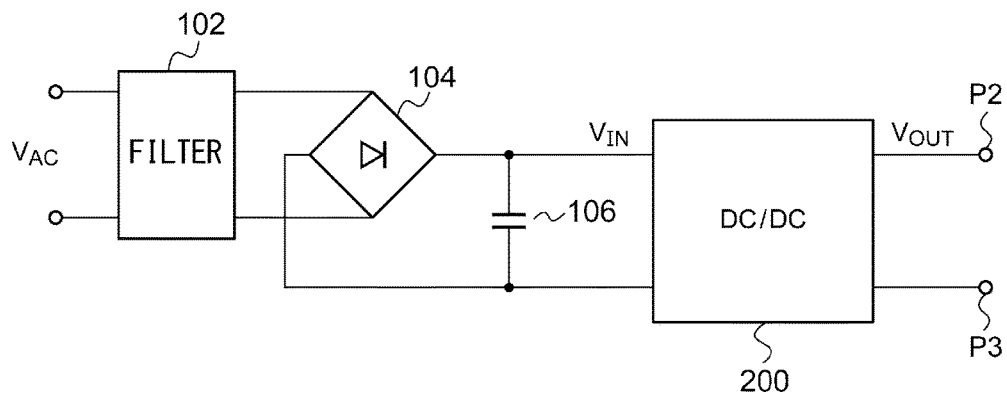
FIG. 7 is a circuit diagram showing an AC/DC converter including a DC/DC converter.

Next, description will be made regarding the usage of the DC/DC converter 200 described in the embodiment. The DC/DC converter 200 may be employed in an AC/DC converter 100. FIG. 7 is a circuit diagram showing the AC/DC converter 100 including the DC/DC converter 200.

The AC/DC converter 100 includes a filter 102, a rectifier circuit 104, a smoothing capacitor 106, and the DC/DC converter 200. The filter 102 removes the noise of the AC voltage $V_{AC}$. The rectifier circuit 104 is configured as a diode bridge circuit that performs full-wave rectification of the AC voltage $V_{AC}$. The smoothing capacitor 106 smoothes the voltage thus subjected to full-wave rectification, so as to generate a DC voltage $V_{IN}$. The DC/DC converter 200 receives the DC voltage $V_{IN}$, and generates an output voltage $V_{OUT}$.

Figure 8:
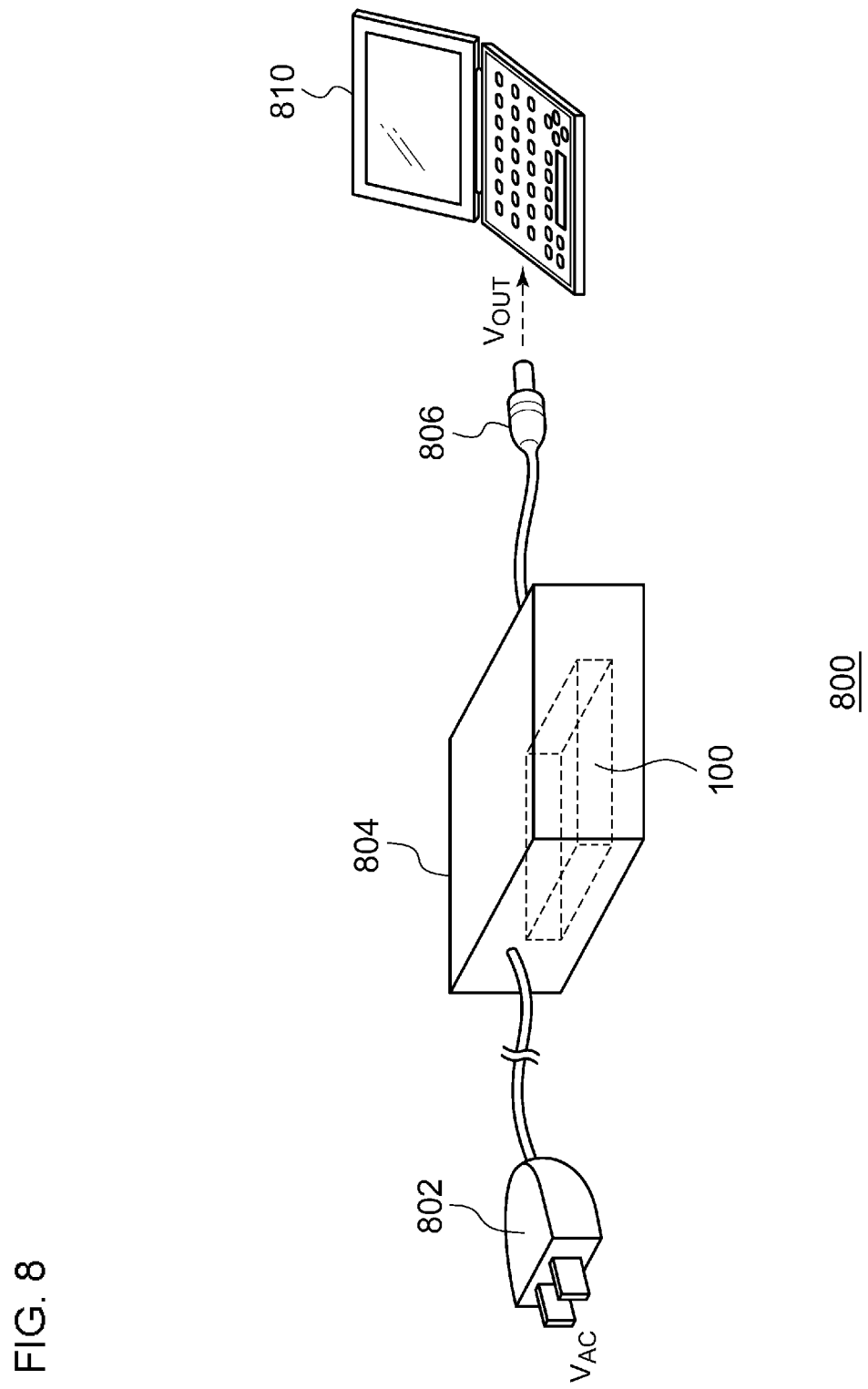
FIG. 8 is a diagram showing an AC adapter including an AC/DC converter.

FIG. 8 is a diagram showing an AC adapter 800 including the AC/DC converter 100. The AC adapter 800 includes a plug 802, a housing 804, and a connector 806. The plug 802 receives a commercial AC voltage $V_{AC}$ from an unshown electrical outlet. The AC/DC converter 100 is mounted within the housing 804. The DC output voltage $V_{OUT}$ generated by the AC/DC converter 100 is supplied from the connector 806 to an electronic device 810. Examples of such an electronic device 810 include laptop PCs, digital still cameras, digital video cameras, cellular phones, portable audio players, and the like.

Figure 9A:
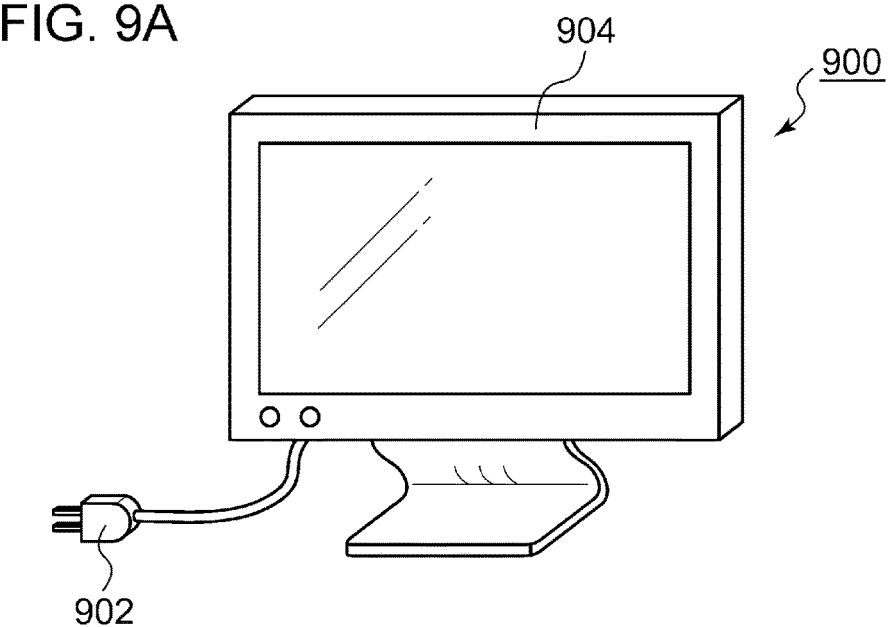
FIGS. 9A and 9B are diagrams each showing an electronic device including an AC/DC converter.
Figure 9B:
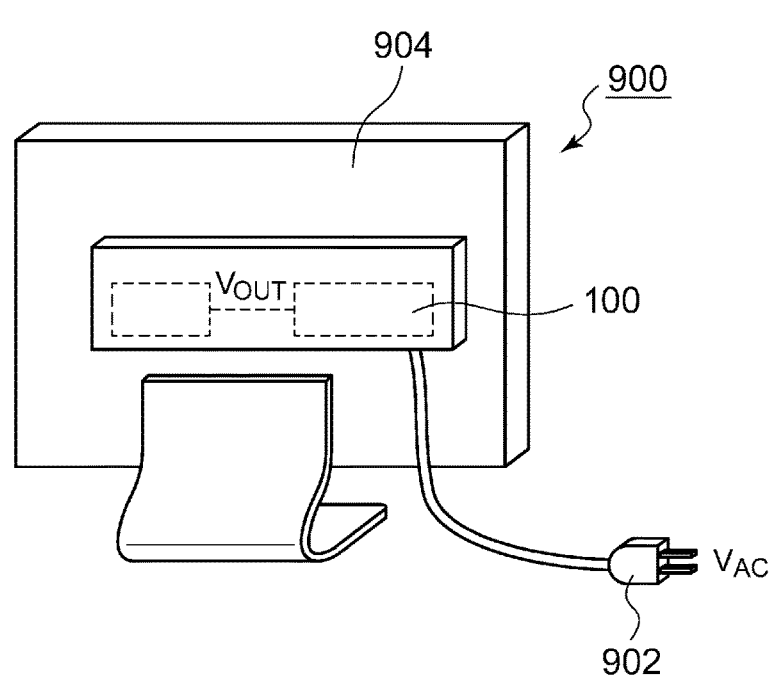

FIGS. 9A and 9B are diagrams each showing an electronic device 900 including the AC/DC converter 100. The electronic devices 900 shown in FIGS. 9A and 9B are each configured as a display apparatus. However, the electronic device 900 is not particularly restricted in kind, as long as it includes a power supply apparatus as an internal component. Examples of such an electronic device 900 include audio devices, refrigerators, washing machines, vacuum cleaners, etc.

A plug 902 receives commercial AC voltage $V_{AC}$ from an unshown electrical outlet. The AC/DC converter 100 is mounted within the housing 904. The DC output voltage $V_{OUT}$ generated by the AC/DC converter 100 is supplied to loads mounted within the same housing 904, examples of which include a microcomputer, DSP (Digital Signal Processor), power supply circuit, illumination device, analog circuit, digital circuit, etc.

While the preferred embodiments of the present invention have been described using specific terms, such description is for illustrative purposes only, and it is to be understood that changes and variations may be made without departing from the spirit or scope of the appended claims.

What is claimed is:

1. An insulated synchronous rectification DC/DC converter comprising:
   a transformer having a primary winding and a secondary winding;
   a switching transistor coupled to the primary winding of the transformer;
   a synchronous rectification transistor coupled to the secondary winding of the transformer;
   a first photocoupler having a light-emitting element and a light-receiving element;
   a feedback circuit structured to drive the light-emitting element of the first photocoupler such that an output voltage of the DC/DC converter approaches a target voltage;
   a primary side controller coupled to the light-receiving element of the first photocoupler, and structured to switch on and off the switching transistor according to a feedback signal received from the first photocoupler;
   a synchronous rectification controller structured to control the synchronous rectification transistor; and
   a protection circuit structured to instruct the primary side controller to stop a switching operation of the switching transistor when a switching-incapable state of the synchronous rectification transistor is detected,
   wherein the protection circuit is structured to judge that the switching-incapable state has occurred when a frequency at which a drain-source voltage of the synchronous rectification transistor crosses a second threshold voltage deviates from a predetermined range.

2. The DC/DC converter according to claim 1, wherein the protection circuit is structured to judge that the switching-incapable state has occurred when an absolute value of a drain-source voltage of the synchronous rectification transistor exceeds a first threshold voltage in a period in which the synchronous rectification transistor is to be turned on.

3. The DC/DC converter according to claim 1, wherein the protection circuit is structured to judge that the switching-incapable state has occurred, based on whether or not a signal at a gate terminal of the synchronous rectification transistor is consistent with an internal signal of the synchronous rectification controller.

4. The DC/DC converter according to claim 1, further comprising a second photocoupler having a light-emitting element coupled to the protection circuit and a light-receiving element coupled to the primary side controller,
   wherein, when the switching-incapable state is detected, the protection circuit drives the light-emitting element of the second photocoupler,
   and wherein, when a current flows through the light-receiving element of the second photocoupler, the primary side controller stops a switching operation of the switching transistor.

5. The DC/DC converter according to claim 1, further comprising a pulse transformer having a primary winding coupled to the protection circuit and a secondary winding coupled to the primary side controller, wherein, when the switching-incapable state is detected, the protection circuit drives the primary winding of the pulse transformer, and wherein the primary side controller is structured to stop a switching operation of the switching transistor based on a state of the secondary winding of the pulse transformer.

6. The DC/DC converter according to claim 1, wherein, when the switching-incapable state is detected, the protection circuit drives the light-emitting element of the first photocoupler.

7. An electronic device comprising:

a load;

a diode rectifier circuit structured to perform full-wave rectification of a commercial AC voltage;

a smoothing capacitor structured to smooth an output voltage of the diode rectifier circuit, so as to generate a DC input voltage; and the DC converter according to claim 1, structured to step down the DC input voltage, and to supply the stepped down DC input voltage to the load.

8. A power supply adapter comprising:

a load;

a diode rectifier circuit structured to perform full-wave rectification of a commercial AC voltage;

a smoothing capacitor structured to smooth an output voltage of the diode rectifier circuit, so as to generate a DC input voltage; and the DC converter according to claim 1, structured to step down the DC input voltage, and to supply the stepped down DC input voltage to the load.

9. A synchronous rectification circuit to be arranged on a secondary side of an insulated synchronous rectification DC/DC converter, and structured to control a synchronous rectification transistor, the synchronous rectification circuit comprising:

a pulse generator structured to generate a control pulse based on a drain-source voltage of the synchronous rectification transistor;

a driver structured to drive the synchronous rectification transistor based on the control pulse;

a detection circuit structured to detect a switching-incapable state of the synchronous rectification transistor; and a notifying circuit structured to transmit a notice of a detection result of the switching-incapable state to a primary side controller arranged on a primary side of the DC/DC converter, wherein the detection circuit is operable to judge that the switching-incapable state has occurred when a frequency at which a drain-source voltage of the synchronous rectification transistor crosses a second threshold voltage deviates from a predetermined range.

10. The synchronous rectification circuit according to claim 9, wherein the detection circuit judges that the switching-incapable state has occurred when a drain-source voltage of the synchronous rectification transistor exceeds a first threshold voltage in a period in which the synchronous rectification transistor is to turn on.

11. The synchronous rectification circuit according to claim 9, wherein the detection circuit judges whether or not the switching-incapable state has occurred based on whether or not a signal at a gate terminal of the synchronous rectification transistor is consistent with an internal signal of the synchronous rectification circuit.

12. The synchronous rectification circuit according to claim 9, wherein the notifying circuit and the primary side controller are coupled via a second photocoupler or otherwise a pulse transformer.

13. The synchronous rectification circuit according to claim 9, monolithically integrated on a single semiconductor substrate.

14. A control method for an insulated synchronous rectification DC/DC converter, the control method comprising:

driving a light-emitting element of a first photocoupler such that an output voltage of the DC/DC converter approaches a target voltage;

switching on and off a switching transistor based on a feedback current that flows through a light-receiving element of the first photocoupler;

generating a control pulse based on a voltage across both terminals of a synchronous rectification transistor;

switching on and off the synchronous rectification transistor according to the control pulse;

detecting a switching-incapable state of the synchronous rectification transistor; and stopping a switching operation of the switching transistor when the switching-incapable state has occurred, wherein, in the detecting of the switching-incapable state, judgement is made that the switching-incapable state has occurred when a frequency at which a drain-source voltage of the synchronous rectification transistor crosses a second threshold voltage deviates from a predetermined range.

15. The control method according to claim 14, wherein, in the detecting of the switching-incapable state, judgement is made that the switching-incapable state has occurred when a drain-source voltage of the synchronous rectification transistor exceeds a first threshold voltage in a period in which the synchronous rectification transistor is to be turned on.

16. The control method according to claim 14, wherein, in the detecting of the switching-incapable state, judgement is made whether or not the switching-incapable state has occurred based on whether or not a signal at a gate terminal of the synchronous rectification transistor is consistent with the control pulse or otherwise an internal signal that corresponds to the control pulse.

* * * * *